United States Patent
Beinborn et al.

(10) Patent No.: US 11,486,321 B2
(45) Date of Patent: *Nov. 1, 2022

(54) SYSTEMS AND METHODS FOR UTILIZING CYLINDER DEACTIVATION WHEN A VEHICLE IS IN A REVERSE OPERATING MODE

(71) Applicants: Cummins Inc., Columbus, IN (US); Tula Technology, Inc., San Jose, CA (US)

(72) Inventors: Aaron William Beinborn, Columbus, IN (US); J. Steven Kolhouse, Columbus, IN (US)

(73) Assignees: Cummins Inc., Columbus, IN (US); Tula Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/390,223

(22) Filed: Jul. 30, 2021

(65) Prior Publication Data

US 2021/0355887 A1 Nov. 18, 2021

Related U.S. Application Data

(63) Continuation of application No. 16/990,764, filed on Aug. 11, 2020, now Pat. No. 11,078,854.

(60) Provisional application No. 62/885,603, filed on Aug. 12, 2019.

(51) Int. Cl.
*F02D 41/14* (2006.01)
*F02D 41/00* (2006.01)
*F02D 13/06* (2006.01)

(52) U.S. Cl.
CPC ........ *F02D 41/0087* (2013.01); *F02D 13/06* (2013.01); *F02D 41/1446* (2013.01); *F02D 2200/1002* (2013.01); *F02D 2200/602* (2013.01); *F02D 2200/702* (2013.01)

(58) Field of Classification Search
CPC .. F02D 41/0087; F02D 41/1446; F02D 13/06; F02D 2200/702; F02D 2200/1002; F02D 2200/602
USPC ................. 123/481, 198 F; 701/95, 112, 113
See application file for complete search history.

(56) References Cited

U.S. PATENT DOCUMENTS 11,078,854 B2 * 8/2021 Beinborn ............ F02D 41/0225
2015/0336561 A1 11/2015 Kuroda et al.

FOREIGN PATENT DOCUMENTS

WO WO-03/022627 A1 3/2003

OTHER PUBLICATIONS

Eisazadeh-Far et al., "Fuel Economy Gains through Dynamic-Skip-Fire in Spark Ignition Engines", Jul. 20, 2015, 10 pages.

* cited by examiner

*Primary Examiner* — Hai H Huynh
(74) *Attorney, Agent, or Firm* — Foley & Lardner LLP

(57) ABSTRACT

A controller for a vehicle includes at least one processor and at least one memory storing instructions that, when executed by the processor, cause the controller to perform various operations. The operations include determining that the vehicle is in reverse and in response, deactivating a cylinder of an engine of the vehicle.

20 Claims, 3 Drawing Sheets

SYSTEMS AND METHODS FOR UTILIZING CYLINDER DEACTIVATION WHEN A VEHICLE IS IN A REVERSE OPERATING MODE

CROSS-REFERENCE TO RELATED PATENT APPLICATIONS

This application is a continuation of U.S. patent application Ser. No. 16/990,764 entitled "SYSTEMS AND METHODS FOR UTILIZING CYLINDER DEACTIVATION WHEN A VEHICLE IS IN A REVERSE OPERATING MODE," filed Aug. 11, 2020, which claims priority to and the benefit of U.S. Provisional Application No. 62/885,603 entitled "SYSTEMS AND METHODS FOR UTILIZING CYLINDER DEACTIVATION WHEN A VEHICLE IS IN A REVERSE OPERATING MODE," filed on Aug. 12, 2019, each of which is incorporated herein by reference in their entireties and for all purposes.

TECHNICAL FIELD

The present disclosure relates to systems and methods for utilizing cylinder deactivation. More particularly, the systems and methods of the present disclosure relate to utilizing cylinder deactivation when a vehicle is in a reverse operating mode.

BACKGROUND

Cylinder deactivation ("CDA") operating mode for a vehicle (e.g., cars and/or trucks) is an operating mode used to deactivate one or more cylinders of an engine of the vehicle while the engine is operating. While operating in a CDA mode, the engine generally produces less power than when all of the engine's cylinders are utilized. For example, a truck may require the use of all cylinders when accelerating from a stop, but may need fewer cylinders when cruising at a constant speed on a highway. A CDA operating mode is typically utilized to conserve fuel (e.g., during idle). While more prevalent in the gasoline engine industry, the CDA operating mode is gaining traction in the diesel engine field as well.

SUMMARY

An example embodiment relates to a controller (e.g., an on-board vehicle controller). The controller for a vehicle includes at least one processor and at least one memory storing instructions that, when executed by the processor, cause the controller to perform various operations. The operations include determining that the vehicle is in reverse and in response, initiating a cylinder deactivation mode for an engine of the vehicle. Utilizing cylinder deactivation when a reverse operating mode for the vehicle is determined or detected may prevent unwanted speed excursions during operation of the vehicle in reverse, reduce fuel consumption for the vehicle while in reverse, and help to maintain relatively hot exhaust gas temperatures while operating in reverse in order to promote catalyst efficiency in an exhaust aftertreatment system of the vehicle.

Another example embodiment relates to a method. The method includes acquiring, by a controller of a vehicle, operation data regarding operation of the vehicle while an engine of the vehicle is in a cylinder deactivation ("CDA") mode; determining, by the controller, that the vehicle is in a reverse operation mode based on the operation data; and maintaining, by the controller, the CDA mode for the vehicle in response to determining that the vehicle is in the reverse operation mode. In this instance, the CDA mode is maintained when a vehicle is put into reverse. The CDA mode may also be changed relative to the CDA mode that was existing when the reverse operating mode was detected or determined.

Still another example embodiment relates to non-transitory computer-readable media (CRM). The CRM includes instructions stored thereon. The instructions, when executed by at least one processor, cause a vehicle computing system to acquire operation data regarding operation of the vehicle; determine that the vehicle is in a reverse operation mode based on the operation data; and initiate a cylinder deactivation ("CDA") mode for the vehicle in response to determining that the vehicle is in the reverse operation mode.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of methods, apparatuses, and systems for utilizing cylinder deactivation when a vehicle is in a reverse operating mode. The various concepts introduced herein may be implemented in any number of ways, as the concepts described are not limited to any particular manner of implementation. Examples of specific implementations and applications are provided primarily for illustrative purposes.

Referring to the Figures generally, the various embodiments disclosed herein relate to systems, apparatuses, and methods for utilizing cylinder deactivation (also known as skip fire) when a vehicle is in a reverse operating mode. The systems, apparatuses, and methods are structured to cause activation of a cylinder deactivation mode based on a determination that a vehicle is in reverse. Beneficially, utilizing a cylinder deactivation mode when a reverse operating mode for the vehicle is determined or detected may prevent unwanted speed excursions during operation of the vehicle in reverse (e.g., it may be undesirable if the vehicle is operated above a certain threshold speed in reverse given the environment of the vehicle, such as in a loading dock), reduce fuel consumption for the vehicle while in reverse, and help to maintain relatively hot exhaust gas temperatures while operating in reverse in order to promote catalyst efficiency in the exhaust aftertreatment system. Often times, during reverse operation, the power output from an engine is relatively lower due to the vehicle traveling at relatively lower speeds. As a result, engine exhaust gas temperatures tend to be relatively lower. In vehicles equipped with exhaust aftertreatment systems, these relatively lower exhaust gas temperatures may adversely affect catalyst activity in the aftertreatment system (e.g., an SCR catalyst's efficiency may decrease). It is desirable to maintain relatively hot exhaust gas temperatures in order to maintain a desired level of catalytic activity in the aftertreatment system. By implementing a CDA operating mode during reverse when the power output is typically lower, engine exhaust gas temperatures may be maintained or increased which promotes improved catalytic activity when the vehicle is operated in reverse. Additionally, this CDA strategy may help to cool down certain parts of the engine expeditiously in order to allow a technician to examine those parts more quickly rather than having to wait for the full engine to cool down. This cooling down may be achieved while the exhaust gas temperatures remain hot in order to promote, for example, catalytic efficiency in the exhaust aftertreatment system. These and other features and benefits of the present disclosure are explained more fully herein.

Figure 1:
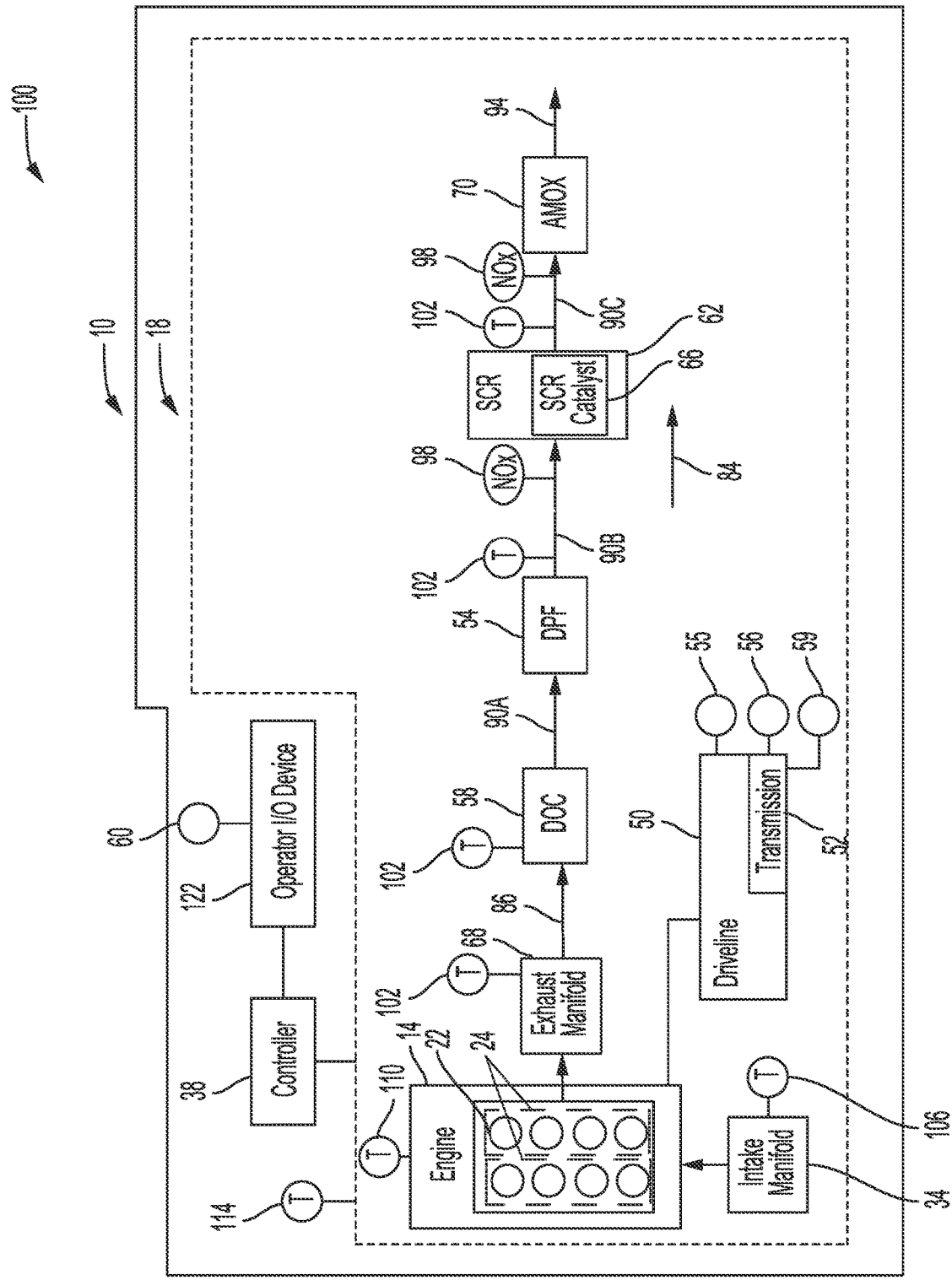
FIG. 1 is a schematic diagram of a vehicle having an engine coupled to an exhaust aftertreatment system and a controller, according to an example embodiment.

Referring now to FIG. 1, a vehicle having an engine coupled to an example exhaust aftertreatment system and a controller is depicted, according to an example embodiment. The vehicle 100 may be an on-road or an off-road vehicle including, but not limited to, line-haul trucks, mid-range trucks (e.g., pick-up trucks), tanks, airplanes, locomotives, various types of industrial equipment (excavators, backhoes, tractors, mowers, etc.), etc. The vehicle 100 generally includes an engine system 10 that includes an internal combustion engine 14, an exhaust aftertreatment system 18 in exhaust gas-receiving communication with the engine 14, a driveline 50 including a transmission 52, an operator input/output (I/O) device 122, and a controller 38 coupled to various components. Each of these components are described in more detail below.

According to one embodiment and as shown, the engine 14 is structured as a compression-ignition internal combustion engine that utilizes diesel fuel. The size/displacement of the engine 14 may vary based on the application (e.g., 30 L to 120 L). Further, the structure of the engine 14 may also vary (e.g., V6-style engine, V8, inline, etc.). In various alternate embodiments, the engine 14 may be structured as various other types of engine. Other examples of the engine 14 include, but are not limited to, other internal combustion engines (e.g., gasoline, natural gas), hybrid engines (e.g., a combination of an internal combustion engine and an electric motor), etc. In the example shown, the engine 14 includes a plurality of cylinders 22. The plurality of cylinders 22 may be arranged into one or more cylinder banks 24. In one example embodiment, the cylinders in the plurality of cylinders 22 are oriented in a V-configuration (e.g., as two cylinder banks 24 like shown).

The exhaust aftertreatment system 18 is in exhaust gas-receiving communication with some or each cylinder bank 24. The exhaust aftertreatment system 18 includes a diesel particulate filter (DPF) 54, a diesel oxidation catalyst (DOC) 58, a selective catalytic reduction (SCR) system 62 with an SCR catalyst 66, and an ammonia oxidation (AMOx) catalyst 70. The SCR system 62 may further include a reductant delivery system that has a diesel exhaust fluid (DEF) source that supplies DEF to a DEF doser via a DEF line.

In operation and according to an example embodiment, combustion air enters the engine system 14 through an engine intake manifold 34 and flows to the plurality of cylinders 22. The engine 14 combusts the air and fuel to create power to propel the vehicle 100. The combustion gases (i.e., exhaust gases) are then vented away from the cylinders 22. In exhaust flow direction as indicated by directional arrow 84, exhaust gas flows from the engine 14 into inlet piping 86 of the exhaust aftertreatment system 18. From the inlet piping 86, the exhaust gas flows into the DOC 58 and exits the DOC 58 into a first section of exhaust piping 90A. From the first section of exhaust piping 90A, the exhaust gas flows into the DPF 54 and exits the DPF 54 into a second section of exhaust piping 90B. From the second section of exhaust piping 90B, the exhaust gas flows into the SCR catalyst 66 and exits the SCR catalyst 66 into the third section of exhaust piping 90C. As the exhaust gas flows through the second section of exhaust piping 90B, it may be periodically dosed with DEF by a DEF doser. Accordingly, the second section of exhaust piping 90B may also act as a decomposition chamber or tube to facilitate the decomposition of the DEF or another reductant to ammonia. From the third section of exhaust piping 90C, the exhaust gas flows into the AMOx catalyst 70 and exits the AMOx catalyst 70 into the outlet piping 94 before the exhaust gas is expelled from the exhaust aftertreatment system 18. Based on the foregoing, in the illustrated embodiment, the DOC 58 is positioned upstream of the DPF 54 and the SCR catalyst 66, and the SCR catalyst 66 is positioned downstream of the DPF 54 and upstream of the AMOx catalyst 70. However, in alternative embodiments, other arrangements of the components of the exhaust aftertreatment system 18 are also possible (e.g., the AMOx catalyst 70 may be excluded from the exhaust aftertreatment system 18, the relative positioning of the components may differ, etc.).

The DOC 58 may have any of various flow-through designs. Generally, the DOC 58 is structured to oxidize at least some particulate matter, e.g., the soluble organic fraction of soot, in the exhaust and reduce unburned hydrocarbons and CO in the exhaust to less environmentally harmful compounds. For example, the DOC 58 may be structured to reduce the hydrocarbon and CO concentrations in the exhaust to meet the requisite emissions standards for those components of the exhaust gas. An indirect consequence of the oxidation capabilities of the DOC 58 is the ability of the DOC 58 to oxidize NO into $NO_2$. In this manner, the level of $NO_2$ exiting the DOC 58 is equal to the $NO_2$ in the exhaust gas generated by the engine 14 plus the $NO_2$ converted from NO by the DOC 58.

The DPF 54 may be any of various flow-through designs, and is structured to reduce particulate matter concentrations, e.g., soot and ash, in the exhaust gas to, e.g., meet one or more requisite emission standards. The DPF 54 captures particulate matter and other constituents, and thus needs to be periodically regenerated to burn off the captured constituents. Additionally, the DPF 54 may be configured to oxidize NO to form $NO_2$ independent of the DOC 58.

As discussed above and in this example configuration, the SCR system 62 may include a reductant delivery system with a DEF source, a pump, and a doser (not shown). The reductant source can be a container or tank capable of retaining a reductant, such as, for example, ammonia ($NH_3$), DEF (e.g., urea), or diesel oil. The reductant source is in reductant supplying communication with the pump, which is configured to pump reductant from the reductant source to the DEF doser via a reductant delivery line. The DEF doser is positioned upstream of the SCR catalyst 66. The controller is structured to control the timing and amount of the DEF delivered to the exhaust gas. In some embodiments, ammonia can be dispensed from the DEF dosers instead of or in addition to DEF. DEF decomposes to produce ammonia. As briefly described above, the ammonia reacts with NOx in the presence of the SCR catalyst 66 to reduce the NOx to less harmful emissions, such as $N_2$ and $H_2O$. The NOx in the exhaust gas stream includes $NO_2$ and NO. Generally, both $NO_2$ and NO are reduced to $N_2$ and $H_2O$ through various chemical reactions driven by the catalytic elements of the SCR catalyst 66 in the presence of $NH_3$.

The SCR catalyst 66 may be any of various known catalysts. For example, in some implementations, the SCR catalyst 66 is a vanadium-based catalyst, and in other implementations, the SCR catalyst is a zeolite-based catalyst, such as a Cu-Zeolite or a Fe-Zeolite catalyst. In one representative embodiment, the reductant is aqueous urea and the SCR catalyst 66 is a zeolite-based catalyst. In some embodiments, an efficiency of the SCR catalyst 66 is temperature dependent, meaning that the SCR catalyst is more efficient at reducing the NOx into less-harmful emissions at higher temperatures.

The AMOx catalyst 70 may be any of various flow-through catalysts configured to react with ammonia to produce mainly nitrogen. As briefly described above, the AMOx catalyst 70 is structured to remove ammonia that has slipped through or exited the SCR catalyst 66 without reacting with NOx in the exhaust. In certain instances, the exhaust aftertreatment system 18 can be operable with or without an AMOx catalyst. Further, although the AMOx catalyst 70 is shown as a separate unit from the SCR catalyst 66 in FIG. 1, in some implementations, the AMOx catalyst 70 may be integrated with the SCR catalyst 66, e.g., the AMOx catalyst 70 and the SCR catalyst 66 can be located within the same housing. In the example shown, the SCR catalyst 66 and AMOx catalyst 70 are positioned serially, with the SCR catalyst 66 preceding the AMOx catalyst 70.

As alluded to above, although the exhaust aftertreatment system 18 shown includes one of an DOC 58, DPF 54, SCR catalyst 66, and AMOx catalyst 70 positioned in specific locations relative to each other along the exhaust flow path, in other embodiments, the exhaust aftertreatment system 18 may include more than one of any of the various catalysts, less components, and/or the relative positions may differ. Further, although the DOC 58 and AMOx catalyst 70 are non-selective catalysts, in some embodiments, the DOC 58 and AMOx catalyst 70 can be selective catalysts.

The vehicle 100 is also shown to include a driveline 50, which includes a transmission 52. The driveline 50 may comprise various additional components (not shown), including a driveshaft, axles, wheels, etc. Transmission 52 receives power from the engine 14 and provides rotational power to a final drive (e.g., wheels) of the vehicle 100. In some embodiments, the transmission 52 is a continuously variable transmission (CVT). In other embodiments, the transmission 52 is a geared transmission comprising a plurality of gears. The transmission 52 may be an automatic, manual, automatic manual, etc. type of transmission. The transmission 52 may include one or more sensors (virtual or real) that couple to the controller 38 and provide information or data regarding operation of the transmission 52 (e.g., the current gear or operating mode, a temperature in the transmission box, etc.).

The operator I/O device 122 is coupled to the controller 38, such that information may be exchanged between the controller 38 and the operator I/O device 122, wherein the information may relate to one or more components of FIG. 1 or determinations/commands/instructions/etc. (described below) of the controller 38. The operator I/O device 122 enables an operator of the vehicle 100 (or another passenger) to communicate with the controller 38 and one more components of the vehicle 100 and components of FIG. 1. The operator I/O device 122 may include a steering wheel, a joystick, an accelerator pedal, a brake pedal, etc. Additionally, the operator I/O device 122 may include an interactive display, a touchscreen device, one or more buttons and switches, voice command receivers, etc. Via the operator I/O device 122, the controller 38 may receive and provide various commands, data, and information concerning the operations described herein.

The vehicle 100 is also shown to include various sensors. The sensors may be strategically disposed throughout the vehicle 100. For example, the engine intake manifold temperature sensor 106 can be positioned at or proximate to the engine intake manifold 34 of the engine system 10 to detect a temperature of air entering the engine system 10. The engine coolant temperature sensor 110 can be strategically positioned to determine a temperature of the engine coolant of the engine 14.

Sensors may also be strategically disposed throughout the exhaust aftertreatment system 18 and in or proximate to the external environment. The sensors may be in communication with the controller 38 to monitor operating conditions of the engine system 10 and monitor various environmental conditions. Aftertreatment system-related sensors can include NOx sensors 98 and temperature sensors 102 positioned within the exhaust aftertreatment system 18, an engine intake manifold temperature sensor 106, and an ambient (e.g., outdoor) temperature sensor 114. In this regard, the controller 38 may receive data from the one or more sensors. As shown, the temperature sensors 102 are associated with the SCR catalyst 66, the exhaust manifold 68, the DOC 58, and the DPF 54. Therefore, temperature data indicative of the temperature of each of these components may be tracked and monitored. For example and regarding the SCR catalyst 66, the temperature sensors 102 are strategically positioned to detect the temperature of exhaust gas flowing into and out of the SCR catalyst 66. In some embodiments, the ambient temperature sensor 114 can be positioned at or proximate to an exterior of the vehicle 100 to determine a temperature of the environment of the vehicle 100. In other embodiments, the ambient temperature sensor 114 can be at a remote location and in wireless communication with the controller 38 of the vehicle 100. In some embodiments, the vehicle 100 may not include the ambient air temperature sensor 114. In such embodiments, the controller 38 can determine the ambient air temperature based on the temperature of air entering the engine intake manifold sensed by the sensor 106.

As alluded to above with respect to the transmission 52, sensors may be strategically disposed throughout the driveline 50. The sensors coupled to the driveline 50 may include a ground speed sensor 55 structured to determine the ground speed of the vehicle 100, a vehicle weight sensor 56 structured to determine the weight of the vehicle 100, and/or a transmission position sensor 59 structured to determine a transmission state (e.g., forward, reverse, neutral, a selected gears, etc.) of the vehicle 100. Sensors may also be strategically disposed throughout the operator input/output (I/O) device 122. For example, the operator I/O device 122 may include an accelerator pedal and may be associated with an accelerator pedal position sensor 60.

The engine 14 is controlled by the controller 38 to initiate and end a cylinder deactivation mode. After initiation of the cylinder deactivation mode which signifies that not all of the cylinders 22 are active (i.e., experiencing or will experience a combustion event), the controller 38 is structured to cause or enable a firing of various combinations of cylinders in the plurality of cylinders 22 to meet the various demands, such as a power output requested from the operator. For example, the controller 38 can monitor the fueling demands for the engine 14 to meet the power output requested from the operator and determine, based on the fueling demand, whether various combinations of the plurality of cylinders 22 are to be activated or deactivated. The controller 38 is structured to cause the engine 14 to fire a higher number of cylinders in the plurality of cylinders 22 when a high engine load is requested. In contrast, the controller 38 may be structured to cause the engine 14 to fire a relatively lower number of the cylinders within the plurality of cylinders 22 when a low engine load is requested (e.g., under low load engine operating conditions).

The controller 38 is structured to control, at least partly, operation of the engine system 10 and associated subsystems, such as the internal combustion engine 14, the exhaust aftertreatment system 18, the driveline 50, and/or the operator I/O device 122. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network ("CAN") bus provides the exchange of signals, information, and/or data. The CAN bus includes any number of wired and wireless connections.

Because the controller 38 is communicably coupled to the systems and components of FIG. 1, the controller 38 is structured to receive data from one or more of the components shown in FIG. 1. For example, the data may include NOx data (e.g., an incoming or outgoing NOx amount from an NOx sensor), temperature data (e.g., the temperatures sensed by the SCR temperature sensor 102, the engine intake manifold temperature sensor 106, the engine coolant temperature sensor 110, the ambient air temperature sensor 114), a vehicle operating data (e.g., accelerator pedal position, requested torque, engine speed, vehicle speed, engine temperature, etc.) received via one or more sensors and/or determined by the controller based on information received from the sensors, and so on. As another example, the data may include an input from operator I/O device 122, such as a demanded engine torque. The structure and function of the controller 38 is further described in regard to FIG. 2.

Figure 2:
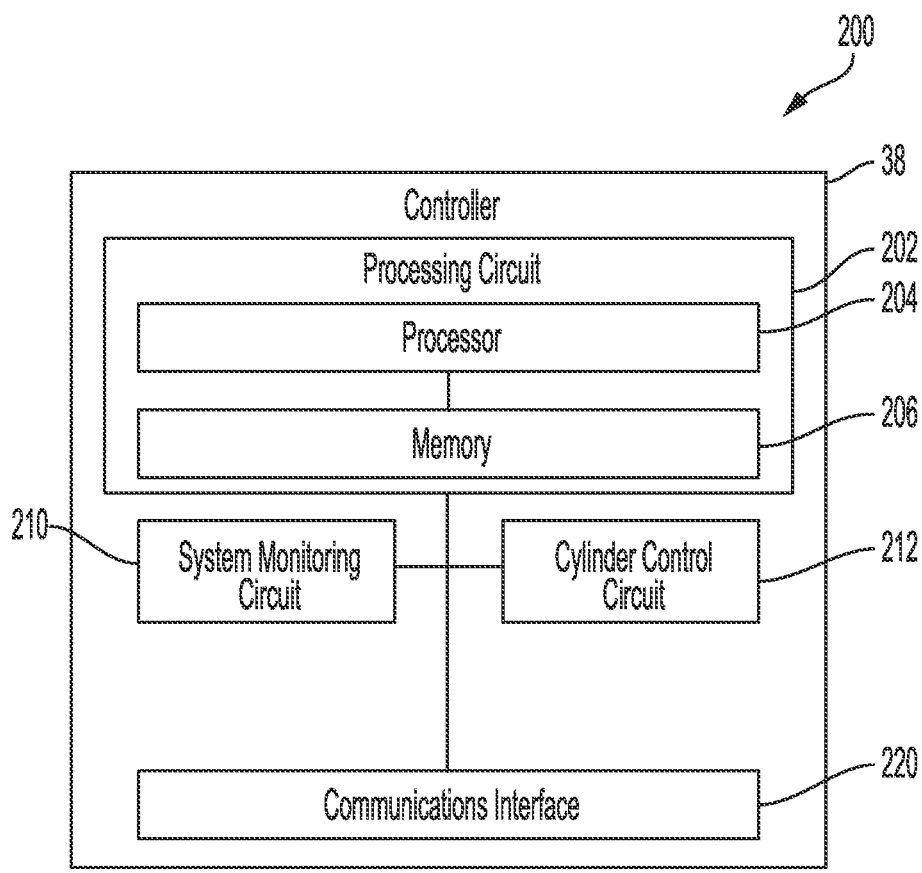
FIG. 2 is a schematic representation of the controller of FIG. 1, according to an example embodiment.

Referring now to FIG. 2, a schematic representation of the controller 38 of FIG. 1 is shown, according to an example embodiment. The controller 38 is structured to control at least some operations of one or more systems of the vehicle 100, such as the engine 14, aftertreatment system 18, transmission 52, operator I/O device 122, etc. In particular, the controller 38 is structured to initiate and end a CDA operating mode. The controller 38 is also structured to activate and/or deactivate at least some of the plurality of cylinders 22 during the CDA operating mode to, in turn, alter operation of the CDA operating mode. It should be understood that the term "CDA mode" is used interchangeably with the term "cylinder deactivation mode" and "skip fire mode." In the example depicted, the controller 38 includes a processing circuit 202 having a processor 204 and a memory device 206, a system monitoring circuit 210, a cylinder control circuit 212, and a communications interface 220.

The communications interface 220 is structured to enable the controller 38 to communicate with in-vehicle components such as a fuel injector(s) as well as external systems, such as remote systems that are a part of a telematics system. The communications interface 220 may include wired and/or wireless interfaces (e.g., jacks, antennas, transmitters, receivers, transceivers, wire terminals, etc.) for conducting data communications with/over these various systems, devices, or networks. For example, the communications interface 220 may include a Wi-Fi transceiver for communicating via a wireless communications network. The communications interface 220 may be structured to communicate via local area networks or wide area networks (e.g., the Internet, etc.) and may use a variety of communications protocols (e.g., TCP/IP, local operating network (LON), controller area network (CAN), J1939, local interconnect network (LIN), Bluetooth, ZigBee, radio, cellular, near field communication, etc.).

In one configuration, the system monitoring circuit 210 and cylinder control circuit 212 are embodied as machine or computer-readable media that is executable by a processor, such as processor 204. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). In one example implementation, the frequency of acquisition and/or transmission of the data is between and including 10 ms and 1000 ms. The computer readable media may include code, which may be written in any programming language including, but not limited to, Java or the like and any conventional procedural programming languages, such as the "C" programming language or similar programming languages. The computer readable program code may be executed on one processor or multiple processors. In the latter scenario, the processors may be connected to each other through a suitable type of network (e.g., CAN bus, etc.).

In another configuration, the system monitoring circuit 210 and cylinder control circuit 212 are embodied as hardware units, such as electronic control units. As such, the system monitoring circuit 210 and cylinder control circuit 212 may be embodied as one or more circuitry components including, but not limited to, processing circuitry, network interfaces, peripheral devices, input devices, output devices, sensors, etc. In some embodiments, the system monitoring circuit 210 and cylinder control circuit 212 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the system monitoring circuit 210 and cylinder control circuit 212 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The system monitoring circuit 210 and cylinder control circuit 212 may also include programmable hardware devices such as field programmable gate arrays, programmable array logic, programmable logic devices or the like. The system monitoring circuit 210 and cylinder control circuit 212 may include one or more memory devices for storing instructions that are executable by the processor(s) of the system monitoring circuit 210 and cylinder control circuit 212. The one or more memory devices and processor(s) may have the same definition as provided below with respect to the memory device 206 and processor 204.

In the example shown, the controller 38 includes a processing circuit 202 having the processor 204 and the memory device 206. The processing circuit 202 may be structured or configured to execute or implement the instructions, commands, and/or control processes described herein with respect to the system monitoring circuit 210 and cylinder control circuit 212. Thus, the depicted configuration represents the system monitoring circuit 210 and cylinder control circuit 212 being embodied as machine or computer-readable media, which may be stored by the memory 206. However, as mentioned above, this illustration is not meant to be limiting as the present disclosure contemplates other embodiments where at least one of the system monitoring circuit 210 and cylinder control circuit 212 is configured as a hardware unit. All such combinations and variations are intended to fall within the scope of the present disclosure.

The processor 204 may be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor, or any conventional processor, or state machine. The processor 204 also may be implemented as a combination of computing devices, such as a combination of a digital signal processor (DSP) and a microprocessor, a plurality of microprocessors, one or more microprocessors in conjunction with a DSP core, or any other such configuration. In some embodiments, the one or more processors may be shared by multiple circuits (e.g., the system monitoring circuit 210 and cylinder control circuit 212), may comprise or otherwise share the same processor which, in some example embodiments, may execute instructions stored, or otherwise accessed, via different areas of memory. Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 206 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory 206 may be coupled to the processor 204 to provide computer code or instructions to the processor 204 for executing at least some of the processes described herein. Moreover, the memory 206 may be or include tangible, non-transient volatile memory or non-volatile memory. Accordingly, the memory 206 may include database components, object code components, script components, or any other type of information structure for supporting the various activities and information structures described herein.

The system monitoring circuit 210 is structured to receive information from various sensors, user controls, and/or actuators of the vehicle 100. Based on the received information, the system monitoring circuit 210 is structured to determine one or more operating parameters regarding operation of the vehicle 100. In particular, the system monitoring circuit 210 is structured to receive information from various sensors of the vehicle 100 via the communication interface 220. The system monitoring circuit 210 may also receive actuation commands from the operator I/O device 122 (e.g., a gear shift or another command to put the vehicle 100 in reverse operating mode, a depression or release of an accelerator pedal to calculate torque requests based on a desired acceleration rate, etc.). The system monitoring circuit 210 may modify or format the received information (e.g., via an analog/digital converter) so that the information can be readily used by the system monitoring circuit 210 or another circuit (e.g., the cylinder control circuit 212).

The system monitoring circuit 210 is structured to determine when the vehicle 100 is in reverse (an operating parameter) based on the received, acquired, or otherwise determined operating data regarding the vehicle (also referred to as operating conditions regarding the vehicle). For example, a transmission sensor may provide a signal to the controller 38 indicating that the transmission is in reverse. As another example, an operator may shift a shifter to reverse, which contemporaneously provides a signal to the controller 38 indicating that the transmission is in reverse. As still another example, a voice command from the operator may be provided when the vehicle is in an autonomous or nearly autonomous vehicle. The controller 38 may determine that the vehicle is in reverse based on this command. As yet another example, a rotational sensor may be coupled to the vehicle that monitors the direction of rotation of the wheels. The sensor may then determine when the wheels are rotating in reverse so that the controller 38 may determine when the vehicle is operating in reverse. Thus, multiple ways of determining by the controller 38 (particularly, the system monitoring circuit 210) when the vehicle is operating in a reverse mode of operation are possible with all such ways intended to fall within the scope of the present disclosure.

When the vehicle 100 is in reverse, the system monitoring circuit 210 is structured to determine control parameters for one or more cylinders 22 of the vehicle based on the operating conditions. In particular, the system monitoring circuit 210 is structured to determine a CDA (skip fire) strategy for the engine 14. Determining a CDA (skip fire) strategy includes making a determination regarding how many cylinders in the plurality of cylinders 22 to activate to achieve a target operating parameter or value (or, vice versa, how many cylinders to deactivate). In addition to the number of active/de-active cylinders, the system monitoring circuit 210 may determine which particular cylinders should be active/de-active—this is referred to as a "pattern" of active/de-active cylinders. For example, once reverse is detected or determined, the system monitoring circuit 210 may determine that only half the number of cylinders 22 are needed to achieve the desired power output given that reverse is typically associated with lower speeds. This may be a default setting that is changed based on detected or determined operating parameters (e.g., a torque request received that indicates more power is needed than is capable from half the cylinders 22 may result in more than half the cylinders being activated). As another example and once reverse is detected or determined, the exhaust gas temperature may be determined (or, temperatures within the exhaust aftertreatment system may be determined or received). If one or more of these temperatures are below a threshold temperature, the number of cylinders active may decrease in order to require more power output from the remaining active cylinders in order to increase exhaust gas temperatures. The cylinders that are active or de-active may be based on a various strategies, such as NVH in order to maintain a balanced operating engine 14.

Accordingly, the system monitoring circuit 210 is structured to receive operating data regarding the operating parameters for the vehicle 100 and compare the determined or received operating parameters to a target operating parameter (e.g., a threshold, a value retrieved from a look-up table stored in the memory or preprogrammed in the controller 38, etc.). As alluded to above, the operating data/parameters may include temperature data for exhaust gas stream and/or one or more components of the aftertreatment system 18 (e.g., DOC and/or SCR), acceleration request data, torque request data, look-ahead data (e.g., route, road curvature, grade, elevation, incline, speed limit, etc.), collision sensor data, proximity sensor data, etc. Based on the comparison and after reverse is detected, the system monitoring circuit 210 may make more granular determinations/decisions regarding operation of the CDA mode, such as how many cylinders to activate/deactivate, which cylinders to activate/deactivate, and the like. The system monitoring circuit 210 is structured to generate and send a signal or a command to the cylinder control circuit 212 to activate or deactivate the specified cylinder(s). Thus, the operations of the system monitoring circuit 210 may include determining how many cylinders in the plurality of cylinders 22 need to be deactivated to reach the specified operating threshold or parameter (e.g., target available torque or a threshold torque amount) over a particular period of time, and causing the circuitry of the controller 38 to generate a control signal for deactivating one or more cylinders.

Based on the received instruction from the circuit 210, the cylinder control circuit 212 is structured to transmit a signal (e.g., an electrical signal) to the appropriate component(s) of the engine 14 to activate or deactivate the specified cylinder(s). The cylinders 22 may include a valve actuation system. The system may include one or more solenoids that are positioned proximate to the cylinder block. One or more solenoids can be actuated by the controller 38 to activate or deactivate the intake and/or exhaust valves in the assembly, which may correspond to one or more cylinders in the plurality of cylinders 22. As a result, the cylinders may be activated or deactivated. For example, by closing the intake and exhaust values of a particular cylinder, that particular cylinder is prevented from intaking air and from "firing" (e.g., experiencing combustion). Thus, the cylinder control circuit 212 has deactivated this particular cylinder. By opening the valves, the circuit 212 may allow combustion to occur in the particular cylinder, thus activating the cylinder.

Based on the foregoing, the system monitoring circuit 210 and cylinder control circuit 212 may operate as follows. When the vehicle is detected to be in reverse, the system monitoring circuit 210 provides an indication to the cylinder control circuit 212 to initiate the CDA operating mode. When in reverse, the system monitoring circuit 210 also determines one or more operating parameters regarding operation of the vehicle. For example, the operating parameters may include a current exhaust gas temperature that is measured or determined by a temperature sensor. The system monitoring circuit 210 may compare the determined operating parameter to a target operating parameter to determine how many and which cylinders should be active and de-active during the CDA operating mode. The cylinder control circuit 212 then implements this determination.

In some embodiments, the controller 38 is a singular unit. In other embodiments, the vehicle 100 comprises multiple vehicle controllers 38. In this regard, the system monitoring circuit 210 and cylinder control circuit 212 may be dispersed in separate physical locations in the vehicle 100. Alternatively and as shown, system monitoring circuit 210 and cylinder control circuit 212 may be embodied in or within a single unit/housing. The controller 38 may be embodied as an engine control unit or various other types of electronic control units for a vehicle.

Figure 3:
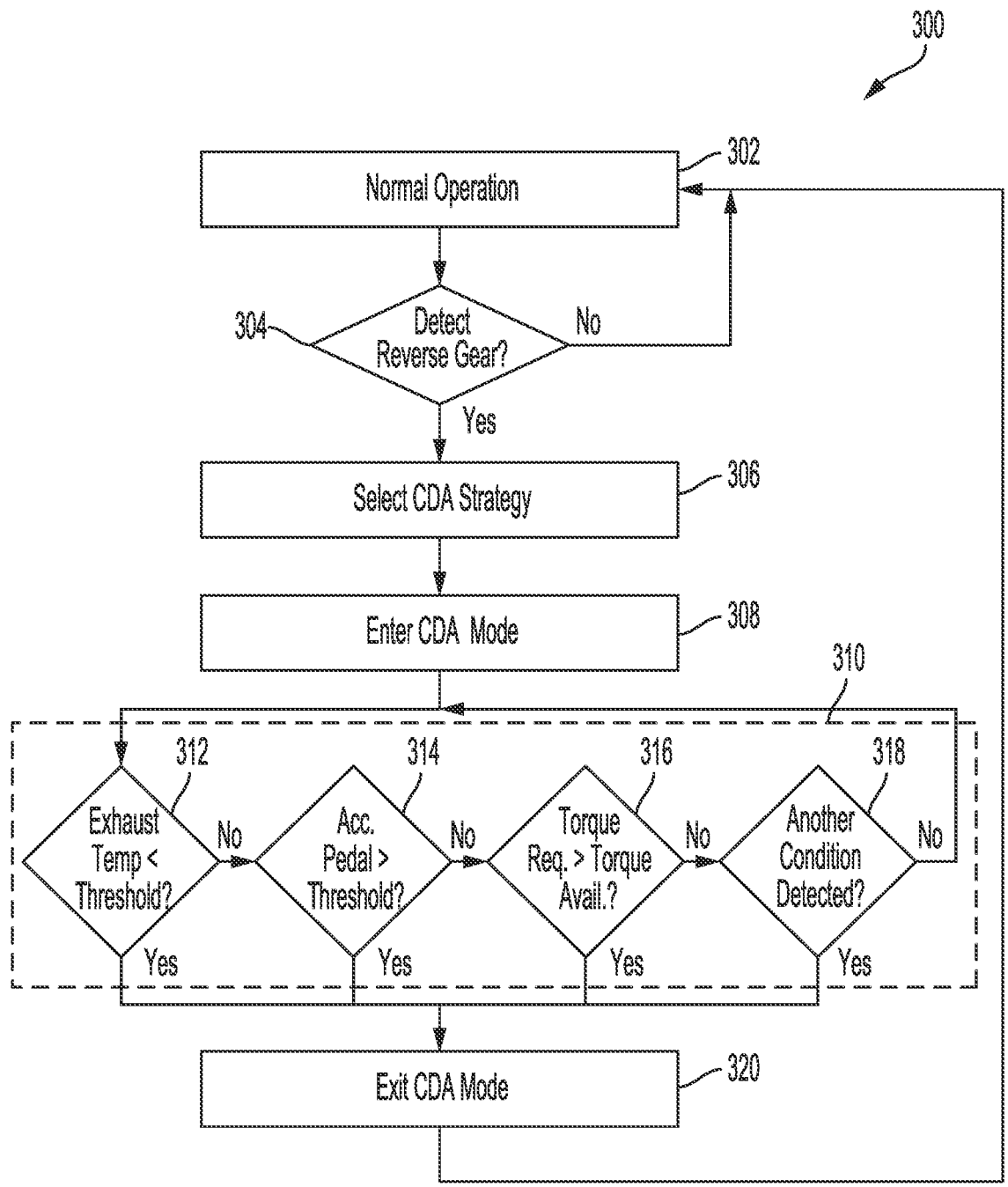
FIG. 3 is a flow diagram of a method of utilizing cylinder deactivation when a vehicle is in a reverse operating mode, according to an example embodiment.

Referring now to FIG. 3, a flow diagram of a method 300 for utilizing CDA mode with continuous or periodic monitoring of vehicle operating parameters while a vehicle is in reverse is shown, according to an example embodiment. The method 300 may be carried out by the components of FIG. 1, such that reference may be made to these components to aid explanation of method 300. At a high level and according to an example embodiment, the method 300 includes detecting that a vehicle 100 is in reverse, determining a CDA strategy, entering a CDA mode, detecting an operating parameter of the vehicle 100, and responsive to comparing the detected operating parameter to a target threshold associated with the detected operating parameter, dynamically reducing or increasing the number of active cylinders or exiting the CDA mode.

The method 300 is shown to include normal operations 302. Normal operations refers to the engine 114 having all of the cylinders in the plurality of cylinders 22 activated (i.e., not in a CDA operating mode).

The method 300 is shown to include a decisional 304. At 304, a determination is made by the system monitoring circuit 210 whether the vehicle 100 is in reverse operating mode. The system monitoring circuit 210 may be structured to receive data or signals from the transmission position sensor 59 coupled to the transmission 52 of the driveline 50. For example, based on data provided by the transmission position sensor 59, the system monitoring circuit 210 may detect that the vehicle 100 is in reverse. In some embodiments, the system monitoring circuit 210 is structured to receive a command or indicator from a robotic vehicle controller, which may be a circuit or a plurality of circuits included in the controller 38 and may comprise an on-board system or a geographically remote system (relative to the vehicle 100). Based on the command received from the robotic vehicle controller, the system monitoring circuit 210 is structured to detect that the vehicle 100 is about to shift to reverse operating mode (this may be used with autonomous or semi-autonomous vehicles). In some embodiments, the system monitoring circuit 210 is structured to receive data or commands from the operator I/O device 120, such as when the operator of the vehicle 100 manually shifts to reverse. Based on the command received from the operator I/O device 120, the system monitoring circuit 210 is structured to detect that the vehicle 100 is about to be in a reverse operating mode.

If the determination made at 304 is negative (that is, the vehicle 100 is not in or about to be in reverse), the controller 38 is structured to maintain the normal operation state of 302 (i.e., no CDA). The system monitoring circuit 210 may be structured to periodically (e.g., every 10 ms, every 100 ms, every 5,000 ms, every 1,000 ms, etc.) continue to execute the operations of 304 to monitor the transmission state of the vehicle 100. If the determination made at 304 is positive (that is, if it is determined by the system monitoring circuit 210 that the vehicle 100 is in reverse), the method 300 proceeds to 306.

At 306, the system monitoring circuit 210 is structured to determine a CDA strategy. Generally, the CDA strategy refers to whether to implement a static CDA mode where the same cylinders remain active or de-active during the CDA mode, or a dynamic CDA mode where decisions regarding whether to deactivate a cylinder are made continuously throughout the CDA operating mode (thus, the pattern of active/de-active cylinders may change from engine cycle to engine cycle). The dynamic CDA operating mode may be more computationally intensive, and in turn, not used as frequently. The CDA strategy may also include determining how many and which cylinders in the plurality of cylinders 22 to be active or de-active. For example, if the last CDA mode corresponded with a group of 3 cylinders being active (of 6 cylinders), this instant CDA mode may correspond with a different group of 3 cylinders being active in order to spread wear and tear out evenly among all the cylinders. It should be understood that the number of the cylinders may change based on the engine architecture (e.g., 4, 6, 8, 12, etc.). Further, the pattern of active/de-active cylinders may be unchanged during the reverse operating mode with CDA or change (e.g., per engine cycle while in reverse).

The number of cylinders to be deactivated when the vehicle 100 is in reverse may be a predetermined value. For example, the system monitoring circuit 210 may be structured to cause a deactivation of half of all the available cylinders in the plurality of cylinders 22 when the vehicle 100 is in detected to be in reverse at 304. This predetermined value may be set by a manufacturer or via the operator I/O device.

The number of cylinders that are active/de-active may also be based on various operating parameters regarding the vehicle. In some embodiments, the system monitoring circuit 210 is structured to prioritize (e.g., rank) operating parameters based on various factors, such as an operator's desired operating mode (e.g., performance or fuel economy), the magnitude of the differential between current and desired/target operating parameter (e.g., the difference between a current and a desired temperature of a catalyst or exhaust stream), etc. Such comparisons may then be used to increase or decrease the number of active cylinders during the CDA mode once reverse is detected.

For example, the number of cylinders to be deactivated may be based on the temperature within the aftertreatment system 18. The system monitoring circuit 210 may determine that an exhaust gas temperature is below a threshold desired value (i.e., a target operating parameter). The system monitoring circuit 210 may then determine the number of cylinders to deactivate in order to increase the exhaust gas temperature to or approximately to the desired exhaust gas temperature (for example, as quickly as possible or within a certain amount of time). The number of cylinders to deactivate to increase the temperature may be based on a magnitude of the difference between the target temperature and the determined temperature. This number may be based on experimental data for similar engine structures. For example and when the target exhaust gas temperature is greater than the detected exhaust gas temperature, experimental data may indicate that four of six cylinders should be deactivated when the difference between the target exhaust gas temperature and the determined exhaust gas temperature is more than X in order to achieve the target exhaust gas temperature in predetermined amount of time (and, three cylinders of six should be de-active when the difference is Y, which is less than X). In this regard, increasing the number of de-active cylinders based on the difference between the target and determined exhaust gas temperature may function to increase exhaust gas temperatures more quickly. Accordingly, the CDA strategy determined at 306 may be structured to enable the vehicle 100 to maintain desired temperatures within the aftertreatment system 18 during reverse vehicle operations. When the detected exhaust gas temperature is greater than or equal to the target temperature, the default CDA operating mode may be implemented (e.g., the default number of cylinders are deactivated, and the cylinders that are deactivated may be based on a predefined control strategy).

More generally, the number of cylinders to deactivate during the CDA operating mode when the vehicle is in reverse may be structured to maintain exhaust gas temperatures above a predefined exhaust gas temperature (to, e.g., promote catalytic activity in the exhaust aftertreatment system). For example, operation data may be received regarding a current exhaust gas temperature when the vehicle is in reverse. Assuming CDA mode is implemented, the controller 38 may compare this detected exhaust gas temperature to a predefined exhaust gas temperature (or, predefined threshold temperature) associated with a desired exhaust gas temperature in the aftertreatment system. The controller 38 may then reference one or more look-up tables, maps, algorithms, etc. to correlate the detected temperature to the desired temperature, where the maps and the like may correlate this relationship to a number of cylinders to deactivate to either get the exhaust gas temperature to at or above the predefined threshold temperature or maintain the exhaust gas temperature to at or above the predefined threshold temperature. In turn, this number of cylinders may be the number of cylinders that are deactivated during the CDA operation mode while the vehicle is in reverse in order to maintain a desired exhaust gas temperature in the aftertreatment system. In certain embodiments, operation data may be continuously acquired such that the mapping between, for example, the detected exhaust gas temperature, predefined temperature threshold, and number of cylinders that are deactivated may continuously evolve or change. This aspect adds a dynamic implementation to the CDA mode when the vehicle is in reverse.

The number of cylinders (and pattern) that are active or de-active may also be based on a variety of other parameters. For example, the system monitoring circuit 210 may determine if the pedal is within a predetermined depression range or over a predetermined depression threshold. In which case, the system monitoring circuit 210 is structured to generate a control signal for deactivating a predefined number of cylinders corresponding to a maximum speed permitted in reverse so that the operator is prevented from going over a particular speed limit (i.e. going over a speed threshold) when the vehicle 100 is in reverse. Thus, determining the number of cylinders to deactivate in a static CDA operating mode is highly configurable. In the dynamic CDA operating mode, the same parameters may be used to help determine which of the plurality cylinders are active or de-active for each engine cycle and how many cylinders are active/de-active each engine cycle.

After the strategy is determined 306, the CDA mode is entered or initiated at 308 while the vehicle is in reverse. The cylinder control circuit 212 is structured to control the cylinder firing dynamics of one or more cylinders of the plurality of cylinders 22 to cause at least some of the cylinders 22 to be deactivated during the CDA mode. A way of activating and deactivating the cylinders is described above (e.g., closing the valves to prohibit combustion from occurring in one or more chosen cylinders).

After initiation of the CDA operating mode, the method 300 includes operations 310, which enable the system monitoring circuit 210 to either maintain various desired operating parameters while the vehicle is in reverse or to enable the vehicle to exit the CDA operating mode. The method 300 may include some or all operations of 312-318 in any combination in various embodiments. The operations at 310 include continuously or periodically (e.g., every 10 ms, every 100 ms, every 5000 ms, every 1,000 ms, etc.) monitoring various operating parameter(s) associated with the various processes 312-318. As described below, these processes may be used as triggers to exit the CDA operating mode.

At 312, the system monitoring circuit 210 continuously or periodically monitors various components of the aftertreatment system 18. In particular, the system monitoring circuit 210 may be structured to periodically monitor the temperature of the exhaust gas and/or catalyst components (e.g., a DOC, an SCR, etc.) based on information received from one or more sensors and/or otherwise determined. The CDA mode may be maintained while the vehicle is in reverse and the exhaust gas temperature is less than a predefined threshold (e.g., a value, a range, etc.). In this regard, only operating a subset of cylinders during the CDA operating mode functions to increase exhaust gas temperatures in order to heat up or maintain a desired temperature of the catalysts within the system 18. If the exhaust gas temperature is above the threshold, the CDA mode may be exited and a return normal operations may occur. In some embodiments and based on the temperature difference between the determined exhaust gas temperature and the threshold value, the number of cylinders deactivated may vary. For example and as mentioned above, when the system monitoring circuit 210 determines that the temperature value is below the predetermined threshold or below a minimum value in a range of values (i.e., a desired exhaust gas temperature), the system monitoring circuit 210 may generate signals or commands to cause the cylinder control circuit 212 to deactivate one or more additional cylinders in the plurality of cylinders 22 in order to increase the temperature of the exhaust gas and thereby increase the temperature of a component of the aftertreatment system 18.

At 314, the system monitoring circuit 210 continuously or periodically monitors the status of a particular operator I/O device 122. In particular, the system monitoring circuit 210 may be structured to periodically monitor the position of an accelerator pedal using data received from the accelerator pedal position sensor 60 (or, determined based on one or more formulas, algorithms, and the like). When the position of the accelerator pedal exceeds a predetermined threshold, which indicates that more power is desired relative to what can be provided by the currently active number of cylinders, the CDA mode may be exited to return to normal operations. As such, the desired power output associated with the position of the accelerator pedal may be achieved. If the determined or detected accelerator pedal position is less than the predefined threshold (e.g., less than or equal to a predefined amount of depression), then the CDA mode may be maintained. In this regard, the number of cylinders are capable of providing the desired power output such that activation of all the cylinders is not necessary.

At 316, the system monitoring circuit 210 continuously or periodically monitors the torque requested from the operator. In particular, the system monitoring circuit 210 may be structured to periodically calculate or determine a requested torque and compare the requested torque to the currently available torque. The requested torque refers to how much power the operator is requesting for doing a maneuver. This may be based on the accelerator pedal position, fueling dynamics, a verbal command from the operator, and the like. For example, a map may be used to correlate the accelerator pedal position to a requested torque. The available torque refers to the amount of torque available from the engine based on the cylinders that are currently deactivated during the CDA mode. For example, when three of six cylinders are deactivated, the available torque is X ft.-lbs., but when two of the six cylinders are deactivated, the available torque is Y ft.-lbs. where Y is greater than X. In other words, increasing the number of deactivated cylinders decreases the amount of available torque. The CDA strategy implemented may correspond with a predefined number of cylinders being deactivated. When the torque requested is greater than the available torque, the circuit 212 may either increase the number of activated cylinders or exit the CDA mode if all the cylinders are required to meet this torque request (or, if the requested number of activated cylinders relative to deactivated cylinders is not allowed because of the engine dynamics if this arrangement were implemented—for example, too much NVH). Thus, increasing the number of activated cylinders or exiting the CDA mode is possible when the torque requested is greater than the torque available. This type of strategy—increasing the number of activated cylinders (or, vice versa, increasing the number of deactivated cylinders) subject to one or more constraints (e.g., engine dynamics, etc.)—may also be implemented with the other 310 processes. When the torque request is less than the torque available, the CDA operating mode may be maintained. In some instances, the torque request may be less than the torque available by more than a predefined amount, which may cause an initial one or more cylinders to be deactivated. This has the advantage of requiring more power output from the now active cylinders to maintain exhaust gas temperatures.

Because the vehicle is operating in reverse, a limiting condition may also be applied to the CDA control strategy. The limiting condition is structured to establish a limit on the maximum number of active cylinders, which functions to limit the power output from the engine while the vehicle is in reverse. This may be beneficial to prevent operators from moving too fast in reverse. In operation and assuming a limiting condition is applied, torque requests that are greater than an available torque (process 316) or accelerator pedal depressions greater than a predefined threshold (process 314) may be ignored such that the current CDA operating mode is maintained. In this regard, a static CDA operating mode may be used which has a predefined number of deactivated cylinders for the vehicle when the vehicle is in reverse. The number of activated and deactivated cylinders may then be constant during the CDA operating mode when the vehicle is in reverse. This default number of cylinders activated may be based on an approximate allowed reverse speed for the vehicle. In this regard, this default number may change from vehicle configuration to vehicle configuration. Accordingly and in operation, the speed of the vehicle in reverse may be limited. As mentioned above, this is beneficial to prevent operators from moving too fast in reverse and unwanted speed excursions in reverse (e.g., if the operator inadvertently presses the accelerator pedal too far down) in order to provide more control during reverse. This may reduce the likelihood of operators inadvertently hitting physical property while in reverse and endangering people nearby the vehicle while the vehicle is in reverse.

Still referring to the operations 300, the system monitoring circuit 210 may also be structured to evaluate (at process 318) additional parameters when making a determination to maintain the CDA mode (or, change operational characteristics of the CDA mode). For example, the system monitoring circuit 210 may be structured to receive (at 318) look-ahead data provided by an on-board GPS system (e.g., route, road curvature, grade, elevation, incline, speed limit, etc.). When the elevation or grade is greater than a predefined threshold, the CDA mode may be exited. This is due to requiring more power output than what may be capable from the CDA mode in order to traverse the grade at a desired speed. As mentioned above, the number of cylinders activated may also be increased in order to increase the power output available to traverse the grade or elevation at the desired speed. The number of cylinders active may be dependent on the grade—for example, a map stored in the controller 38 may be used to correlate detected or determined grades to the number of cylinders active while in reverse in order to traverse the grade in reverse at a predefined speed. In certain instances, the map may indicate that CDA mode should not be used for a given grade, which then exits the CDA mode.

Thus, in each of these processes of 310, the controller 38 may either deactivate the CDA operating mode or adjust operation of the CDA operating mode (change the number of active/de-active cylinders based on one or more target parameters). The list of parameters used by the controller 38 to maintain or exit the CDA mode above is not exhaustive as other parameters may also be used.

At process 320, the system monitoring circuit 210 is structured to generate a signal or command for the cylinder control circuit 212 to exit the CDA mode to return to normal operation.

While method 300 is described in regards to initiating the CDA mode, a similar process may be utilized to maintain the CDA mode when reverse operation mode for a vehicle is determined or detected. In this regard, CDA mode may already be active when reverse is detected or determined. For example, the controller 38 may acquire or receive operation data regarding operation of the vehicle while the engine of the vehicle is in the cylinder deactivation CDA mode. The controller 38 may determine or detect that the vehicle is in a reverse operation mode based on the operation data (e.g., a transmission sensor indicates that the transmission of vehicle has been put into reverse). In response, the controller 38 may maintain the CDA mode for the vehicle. Thus, CDA mode is maintained in this example.

The aforementioned described processes of method 300 may also be applied to this maintaining of the CDA mode. For example, a limiting condition may be applied. For example, the number of cylinders deactivated while the vehicle is in reverse may be greater than while the vehicle is in normal operation. In this regard, the available speed from the vehicle may be limited. This may be beneficial in a variety of situations, such as with new drivers who are not as comfortable in reverse, trucks backing up into loading docks, etc. Further and for example, adjusting the number of active/de-active cylinders and exiting out of the CDA mode as described above may also be applicable with this situation of maintaining the CDA mode when reverse vehicle operations are detected or determined.

Similarly and as alluded to above, a comparison between the current CDA strategy to an optimum CDA strategy/skip fire mode during reverse under current operating conditions may also be performed. In particular, the controller 38 may have knowledge of the current CDA operating mode before reverse is determined or detected. When reverse is determined or detected, the controller 38 may determine an optimum CDA strategy for the operating conditions at the time reverse is determined or detected. For example, when reverse is detected, only two of six cylinders are deactivated and the exhaust gas temperatures are below a predefined threshold. Based on experimental data regarding these conditions, the controller 38 may know that an optimum condition is to deactivate an additional two cylinders in order to achieve a desired exhaust gas temperature. Thus, the CDA strategy changes from two-cylinder deactivation to four-cylinder deactivation when the vehicle transitions from normal to reverse operating mode. As a variation and in addition to or alternative to, a CDA pattern may change based on the detected operating conditions of the vehicle when reverse is detected or determined (e.g., which cylinders are active). If the current CDA strategy aligns with the determined optimum CDA strategy for the vehicle conditions when reverse is detected or determined, then the current CDA strategy from before reverse is detected or determined may be maintained (i.e., no change from operation of the CDA mode from before reverse was detected until after reverse is detected).

While described above as being based on exhaust gas temperatures, the vehicle operating conditions that may influence when to keep or change the current CDA strategy are highly variable. For example, in some instances such as when new drivers are being trained, the default CDA strategy for reverse is minimal power output in order to keep vehicle speeds down. Thus, when the comparison is done, the current vehicle operating conditions may be slightly ignored in favor of the desired operating characteristics of keeping power output low. Thus, a change in operation of CDA strategy from when the vehicle is operating normally to being in reverse is likely to occur.

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional high members. For example, circuit A communicably "coupled" to circuit B may signify that circuit A communicates directly with circuit B (i.e., no intermediary) or communicates indirectly with circuit B (e.g., through one or more intermediaries).

While various circuits with particular functionality are shown in FIG. 2, it should be understood that the controller 38 may include any number of circuits for completing the functions described herein. For example, the activities and functionalities of the circuits may be combined in multiple circuits or as a single circuit. Additional circuits with additional functionality may also be included. Further, the controller 38 may further control other activity beyond the scope of the present disclosure.

As mentioned above and in one configuration, the "circuits" may be implemented in machine-readable medium for execution by various types of processors, such as the processor 204 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example, the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A controller for a vehicle comprising at least one processor and at least one memory storing instructions that, when executed by the at least one processor, cause the controller to:
   determine that the vehicle is in reverse; and
   in response, deactivate a cylinder of an engine of the vehicle.

2. The controller of claim 1, wherein the deactivated cylinder includes a predetermined number of cylinders.

3. The controller of claim 1, wherein in response to an accelerator pedal being depressed by more than a threshold amount, the controller is structured to activate the deactivated cylinder.

4. The controller of claim 1, wherein in response to a requested torque amount being greater than an available torque amount or a preset threshold amount, the controller is structured to activate the deactivated cylinder.

5. The controller of claim 1, wherein in response to at least one of an aftertreatment system temperature or an exhaust gas temperature being below a predefined temperature threshold, the controller is structured to maintain the deactivated cylinder.

6. The controller of claim 1, wherein the instructions, when executed by the at least one processor, cause the controller to maintain the deactivated cylinder based on operation data associated with the vehicle.

7. The controller of claim 6, wherein the operation data comprises at least one of a road curvature, a road grade, a road elevation, or a road speed limit, and wherein the instructions, when executed by the at least one processor, cause the controller to adjust a number of active cylinders based on the operation data while the vehicle is in reverse.

8. A method, comprising:
   determining, by a controller of a vehicle, a direction of movement of a final drive of the vehicle; and
   deactivating, by the controller, a cylinder of an engine of the vehicle in response to the determined direction of movement of the final drive of the vehicle.

9. The method of claim 8, wherein the final drive includes a wheel.

10. The method of claim 9, wherein the direction of movement includes a direction of rotation of the wheel that corresponds with a reverse direction of movement.

11. The method of claim 8, further comprising maintaining, by the controller, the deactivation of the cylinder based on at least one of an exhaust aftertreatment system temperature or an exhaust gas temperature being below a predefined temperature threshold.

12. The method of claim 8, further comprising:
   receiving, by the controller, a torque request greater than an available torque amount; and
   cancelling, by the controller, the torque request to limit a power output from the engine of the vehicle.

13. The method of claim 8, further comprising:
   receiving, by the controller, at least one of a curvature of a route, a grade of the route, an elevation of the route, or a speed limit regarding the route of the vehicle; and
   adjusting, by the controller, a number of active cylinders based on the at least one of the curvature of the route, the grade of the route, the elevation of the route, or the speed limit regarding the route of the vehicle.

14. A method, comprising:
   acquiring, by a controller of a vehicle, operation data regarding operation of the vehicle while a cylinder of an engine of the vehicle is deactivated;
   determining, by the controller, that the vehicle is in an operating mode based on the operation data; and maintaining, by the controller, the deactivation of the cylinder of the engine of the vehicle based on determining that the vehicle is the operating mode.

15. The method of claim 14, wherein the operating mode is a reverse operation mode, and wherein determining that the vehicle is in the operating mode comprises determining, by the controller, that a transmission setting of the vehicle is in a reverse operation mode.

16. The method of claim 14, wherein determining that the vehicle is in the operating mode is based on a direction of movement of the vehicle.

17. The method of claim 16, wherein the direction of movement is based on a movement of a final drive of the vehicle, wherein the final drive includes a wheel, and wherein determining that the vehicle is in reverse is based on a direction of rotation of the wheel.

18. The method of claim 14, wherein the operation data further comprises a curvature of a route, a grade of the route, an elevation of the route, or a speed limit regarding the route of the vehicle, and
wherein the method further comprises periodically adjusting, by the controller, a number of active cylinders based on the curvature of the route, the grade of the route, the elevation of the route, or the speed limit regarding the route of the vehicle while the vehicle is in the operating mode.

19. The method of claim 14, further comprising:
maintaining, by the controller, the deactivation of the cylinder of the engine of the vehicle based on at least one of an exhaust aftertreatment system temperature or an exhaust gas temperature being below a predefined temperature threshold.

20. The method of claim 14, wherein the deactivated cylinder corresponds with a number of cylinders that is greater than a number of cylinders deactivated before the vehicle is determined to be in the operating mode.

* * * * *